June 7, 1966  J. C. TRAVILLA  3,254,611

RAILWAY VEHICLE TRUCK

Filed Oct. 23, 1961  4 Sheets-Sheet 1

INVENTOR.
JAMES C. TRAVILLA
BY Bedell & Burgess
ATTORNEYS

June 7, 1966  J. C. TRAVILLA  3,254,611
RAILWAY VEHICLE TRUCK
Filed Oct. 23, 1961  4 Sheets-Sheet 2
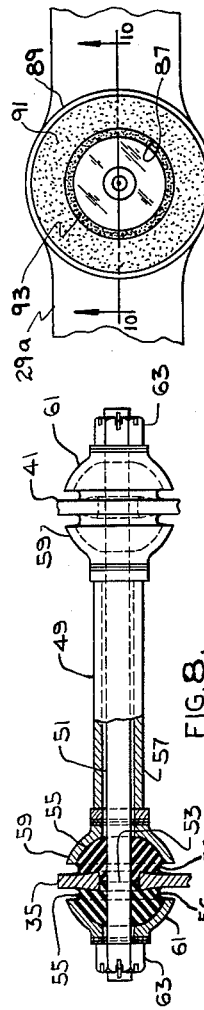
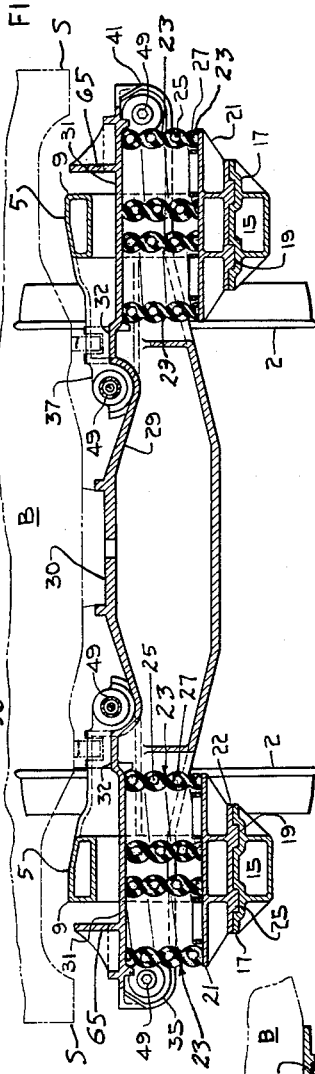
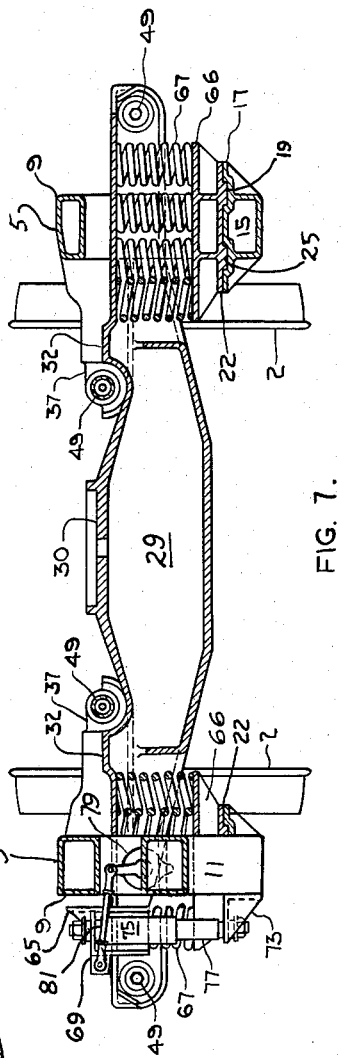
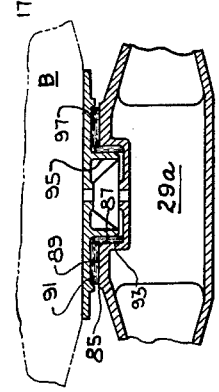
INVENTOR.
JAMES C. TRAVILLA
BY Bedell & Burgess
ATTORNEYS June 7, 1966

J. C. TRAVILLA 3,254,611

RAILWAY VEHICLE TRUCK

Filed Oct. 23, 1961

INVENTOR.
JAMES C. TRAVILLA
BY Bedell & Burgess
ATTORNEYS

June 7, 1966

J. C. TRAVILLA 3,254,611

RAILWAY VEHICLE TRUCK

Filed Oct. 23, 1961

INVENTOR.
JAMES C. TRAVILLA

BY *Bedell & Burgess*
ATTORNEYS

United States Patent Office 3,254,611
Patented June 7, 1966

1

3,254,611
RAILWAY VEHICLE TRUCK
James C. Travilla, Ladue, Mo., assignor to General Steel Industries, Inc., Granite City, Ill., a corporation of Delaware
Filed Oct. 23, 1961, Ser. No. 146,969
24 Claims. (Cl. 105—197)

The invention relates to railway rolling stock and consists particularly in trucks therefor especially adapted for high speed freight service.

Conventional freight car trucks have two axles and separate side frame members in the form of queen-post trusses non-resiliently supported on the ends of the axles. Metal coil springs seated on the bottom chords of the side frames support a load-carrying transverse bolster which extends between and has vertical side walls frictionally engaging transverse vertical surfaces of guides on the side frame columns, while spaced flanges on the bolster side walls engage inner and outer vertical surfaces of the column guides. This engagement of the bolster and the column guides is for the purpose of holding the side frames in proper spaced relation and maintaining the truck in tram. At the same time some clearance between the bolster and column guides is necessary to permit the side frames to tilt relative to each other about a transverse axis so as to equalize distribution of the load to the wheels regardless of individual vertical irregularities in the opposite rails. However, this clearance must be kept to a minimum initially, to effect proper tramming of the truck. In practice, as the column guides and cooperating bolster surfaces wear, the effectiveness of this arrangement to maintain the side frames in tram decreases, with consequent increase in flange wear, truck resistance and the tendency of the truck to derail as the side frames become freer to shift longitudinally relative to each other, and the axles accordingly move to positions out of square with the track. A further disadvantage of this relationship between the bolster and the side frames is that it interferes with relative lateral movements of the bolster and the side frames, which are desirable to cushion lateral shocks due to track irregularities. Another disadvantage of such conventional trucks is that the constant vertical rate of the coil springs produces a substantial variation in the riding qualities of the car between light and loaded conditions. Metal coil springs also require separate damping means to prevent the build-up of harmful oscillations with consequent damage to the car structure and lading.

Accordingly it is a main object of the invention to provide a fully equalized car truck of the separate side frame type with means for positively retaining it in tram while permitting lateral movement of the bolster relative to the side frames.

It is a further object to effectuate the main object by eliminating column guides and connecting the bolster to each of the side frames by transversely-spaced longitudinally-extending anchor links.

It is a further object to provide an improved anchor link having a high longitudinal rate and a lower lateral and vertical rate, for the effectuation of the immediately preceding objects.

It is a further object to provide a truck as described in the preceding objects having variable vertical rate springs comprising metal coils embedded in masses of elastomeric material.

A still further object is to provide a truck as referred to in the previous objects in which damping both laterally and vertically is accomplished by the use of elastomeric material in the springs and/or the anchors.

It is another object to provide a truck of the type referred to in the foregoing objects with means for oppos-

2 ing swiveling oscillations of the truck about its pivotal connection to the car body.

Other objectives are low cost, full interchangeability with standard freight car trucks by reason of standard center plate height and side bearing location, the use of conventional freight brakes either of the hanger or sliding type, adaptability for roller bearing or plain bearing journals, and convertibility to coil springs if desired.

Further advantages are safety in case of anchor or spring failure, ease of wheel or spring change-out, light weight, and low maintenance cost.

The foregoing and additional objects and advantages will be evident from the following description and the accompanying drawings, in which:

FIG. 3 is a transverse vertical sectional view along line 3—3 of FIG. 1.

FIG. 7 is a transverse vertical sectional view along line 7—7 of FIG. 5.

FIG. 8 is an enlarged view of an anchor used in both embodiments of the invention, partially sectionalized.

FIG. 9 is a fragmentary top view of a modified bolster structure.

FIG. 10 is a transverse vertical sectional view along line 10—10 of FIG. 9.

Figure 1:
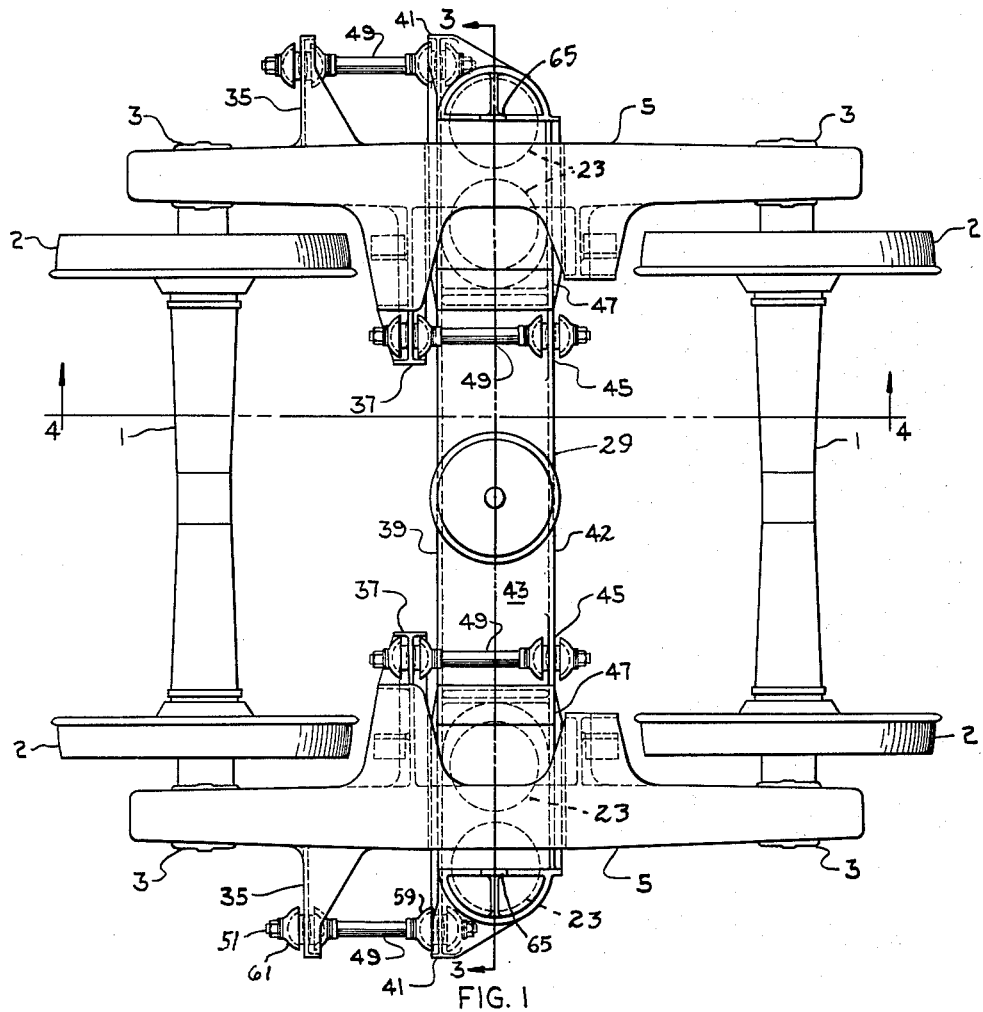
FIG. 1 is a top view of a truck embodying the invention.
Figure 2:
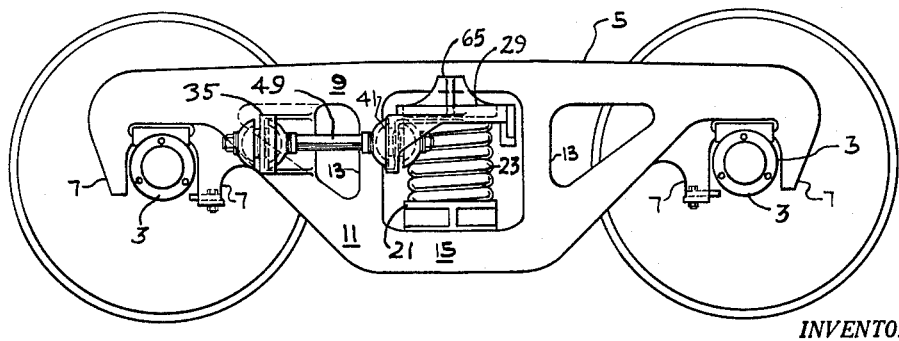
FIG. 2 is a side elevation view of the truck illustrated in FIG. 1.

Referring to the drawings, a pair of rotatable assemblies comprising axles 1 and spaced wheels 2 mounted thereon support, at their ends, journal boxes 3. Separate side frames 5 are formed at their ends with depending pedestal jaws 7, in which are received journal boxes 3, by means of which side frames 5 are non-resiliently supported on wheel and axle assemblies 1, 2. Intermediate pedestal jaws 7, each of the side frames 5 is in the form of a queen-post truss having a top chord 9 and a bottom chord 11 merging at its ends, adjacent the pedestal jaws, with top chord 9 and spaced therefrom intermediate its ends by upright columns 13 which are spaced apart longitudinally of the side frame, bottom chord 11 being horizontal between columns 13, as at 15. The upper surface of bottom chord intermediate portion 15 is widened as at 17 and is provided with upwardly open recesses 19 in its surface whereby to stably support spring seat 21 having a horizontal bottom wall 22 formed with depending bosses 25 receivable within recesses 19. Each of the spring seats 21 supports a pair of upright springs 23 having their axes disposed symmetrically with respect to the longitudinal axis of the supporting side frame and in a common vertical plane transverse of the truck. Each of the springs 23 comprises a metal coil spring 25 embedded in a hollow substantially cylindrical mass 27 of rubber or other elastomeric material, and having inner and outer surfaces conforming substantially to the windings of the coil. Such springs have a variable rate characteristic and are to a large extent self-damping because of the damping characteristic of the elastomer.

A transverse bolster 29 is supported on springs 23 through its end portions 31 which extend through the side frame windows formed by top chords 9, bottom chord intermediate portions 15 and columns 13. The central portion of bolster 29 is of box section and is formed intermediate its ends with an upwardly facing pivot center plate 30, on which is pivotally supported body bolster B (FIG. 3). The end portions of bolster 29 are of downwardly-open channel cross section so as to receive the tops of the springs, and are somewhat narrower than the side frame windows so that there is no engagement and possibility of wear between columns 13 and the bolster or of interference with the longitudinal tilting movement of the side frames relative to each other which is required for full equalization. At the junctures of the bolster central and end portions the bolster top wall is slightly elevated to form a mounting for side bearings 32. Between the side bearings and center plate the truck bolster top wall is depressed for reasons which will appear below.

For maintaining the truck in tram, i.e., the side frames at right angles to the bolster, bolster 29 is connected to each of the side frames by pairs of longitudinally-extending transversely-spaced parallel anchor links 49. To effect this connection, each of the side frames is formed with an outwardly-extending bracket including a transverse vertical plate-like web 35 and suitable gussets spaced lengthwise of the side frame from the window at a height slightly lower than the bolster end portion. Generally similar brackets with transverse vertical plate-like webs 37 extend inwardly from each of the side frames through the space between the bolster and the wheels at the same end of the truck as outboard bracket webs 35. The side wall 39 of the bolster on the side thereof nearest bracket webs 35 is extended outwardly at each end of the bolster to form transverse vertical plate-like webs 41 aligned with brackets 35, and the opposite side wall 42 of the bolster is extended above the depressed portion of the bolster top wall 43 immediately inboard of side bearings 32 to form transverse vertical plate-like webs 45 aligned lengthwise of the truck with inboard side frame bracket webs 37. Bracket webs 35 and 41, and 37 and 45 respectively are formed with aligned perforations and are connected by longitudinally extending parallel anchor links 49, an example of which is best seen in FIG. 8, so that bolster 29 can move vertically, or transversely relative to the side frames, but cannot angle in the horizontal plane from its normal position perpendicular to the side frames. To minimize the height of the inboard anchor links, they pass through the depressions in the bolster inboard of the side bearings and their connections to the bolster and the side frames on opposite sides of the bolster, longitudinally of the truck, makes it possible for the inboard anchor links and their associated mounting bracket webs on the side frames to clear the wheels longitudinally of the truck. The outboard anchor links, by being offset longitudinally from the bolster, are at a lower level than the top of the bolster, thus assuring that they will not interfere with car body side sills mounted at S on the ends of body bolster B (FIG. 3).

Each of the anchor links 49 consists of a rod 51 threaded at both ends and extending through openings 53, of greater diameter than the rod, in the bracket webs, the opposite transverse surfaces of which surrounding openings 53 are slightly convex. Elastomeric, preferably natural rubber, complementary masses of substantially hemispherical shape, centrally apertured for mounting on rod 51 on both sides of each of the brackets are so mounted and have annular bosses around the apertures extending into the openings 53 so as to space rod 51 from the peripheries thereof and accommodate its angling with respect to the brackets. Hemispherical masses 55 are annularly rabbeted as at 56, along their peripheral edges, to reduce compressive resistance by the rubber to angling of the rods by permitting the rubber to flow into the grooved recess when the rod is subjected to forces tending to cause it to angle. Between the inner masses 55, a tubular spacer 57 surrounds rods 51 and abuts at its ends substantially collars 59 having concave semi-spherical surfaces facing outwardly lengthwise of the rod for engagement with the inner elastomeric masses 55. On the opposite sides of the brackets, adjacent the ends of rod 51, similar collars 61 are mounted on rod 51 with their concave surfaces facing inwardly lengthwise of the rod. The latter are held in engagement with the outer elastomeric masses 55 and all the elastomeric masses 55 are maintained in compression by means of nuts 63 on the threaded ends of rod 51. As is evident from the drawings, elastomeric masses 55 space the rims of collars 59 from the adjacent surfaces of brackets 35 and 41 so as to accommodate angling of the rod solely by distortion of the elastomeric material and to avoid the possibility of metal to metal contact of collars 59 and 61 with the surfaces of the bracket. As a result of the spherical configuration of the connections of the anchor links 49 to the brackets, these anchor links have a very high longitudinal rate but very low lateral and vertical rates so that they freely accommodate, through torsional and transverse shear in the elastomeric masses, such vertical and transverse movements of the bolster relative to the side frames as may be permitted by deflection of springs 23, while they positively oppose, by the high resistance of the elastomeric masses to compression, any substantial movement of the bolster longitudinally of the side frames. Because the inner and outer anchors 49 connecting the bolster to each of the side frames are parallel to each other, the bolster is maintained at right angles to the side frames and the truck is accordingly held in tram, irrespective of relative lateral or vertical movements of the bolster with respect to the side frames.

For preventing excessive lateral movements of the bolster relative to the side frames, the bolster end portions are formed, outboard of the side frames, with upstanding stop abutments 65, which are engageable with the top chord 9 of the side frames when predetermined lateral displacement of the bolster is reached.

Figure 5:
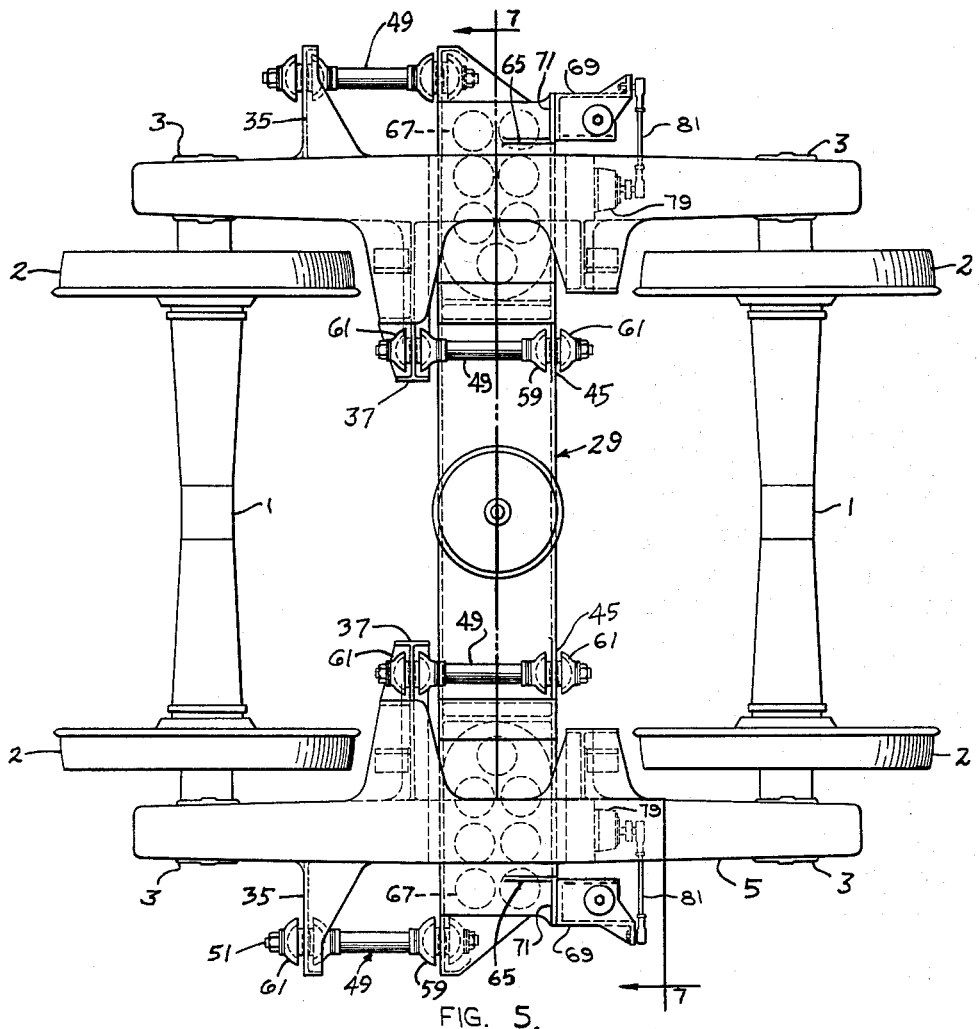
FIG. 5 is a top view of a modified truck embodying the invention.
Figure 6:
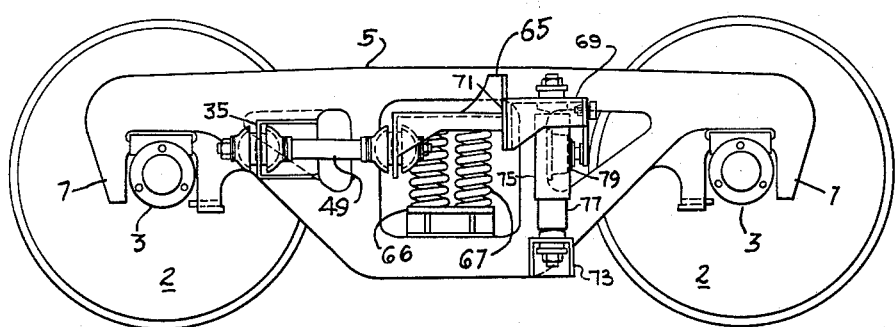
FIG. 6 is a side elevation view of the truck shown in FIG. 5.

The truck can easily be modified for use with conventional coil springs (as shown in FIGS. 5–7) if that is desired. This is accomplished by substituting a spring seat 66 for the spring seat 21 used with the coil-rubber springs 23, the substitution being easily effected because both spring seats 21 and 66 have identical bottom walls 22 which are similarly engageable with upper surface 17 of the side frame bottom chord intermediate members 15. To compensate for the absence of self-contained damping means in coil springs 67, a bracket 69 is mounted on the end portion of bolster side walls 71, an outboard bracket 73 is mounted on the side frame bottom chord 11, and a friction snubber of conventional type having relatively movable parts 75 and 77, connected respectively to brackets 69 and 73, is provided to dampen the vertical oscillations of the coil springs 67. If desired, a hydraulic shock absorber 79 can be mounted on the adjacent column with its laterally-extending operating rod 81 connected to bracket 69 for dampening lateral oscillations of the coil springs.

FIGS. 9 and 10 illustrate a modified form of bolster 29a in which a central bearing 85 of improved type is provided instead of the conventional center plate 30 in order to reduce oscillations of the truck about its vertical pivot axis, since such oscillations greatly detract from the riding qualities of the car and substantially increase wheel wear. Central bearing 85 comprises a cylindrical recess 87 in the top wall of the bolster and a horizontal annular surface 89 surrounding recess 87. Annular surface 89 seats a flat annulus 91 of friction material and the vertical walls of cylindrical recess 87 are lined with a liner 93 of similar friction material, the supported car body bolster B (FIG. 10) being provided with a mating device comprising a depending cylindrical projection 95 surrounded by a horizontal annular surface 97, projection 95 being rotatably received within recess 87 and horizontal surface 97 being seated on the upper surface of friction pad 91. Because of the relatively large diameter of the friction pad and the opposing surfaces 89 and 97, a considerable moment of frictional resistance will be provided to effectively oppose tendencies of the truck to oscillate about its vertical pivot axis. The use of central bearing 85 makes possible the elimination of side bearings 32, because the width (diameter) of the bearing is sufficiently great to prevent tilting of the body on the bolster under normal operating conditions. The use of a bearing of this type on a conventional freight car truck would be precluded because the resistance offered by the friction material to swiveling and to oscillation would likely increase the tendency of the truck to go out of tram particularly on curved track. This would not happen with the present truck because of the positive tramming action provided by anchor links 49.

Figure 11:
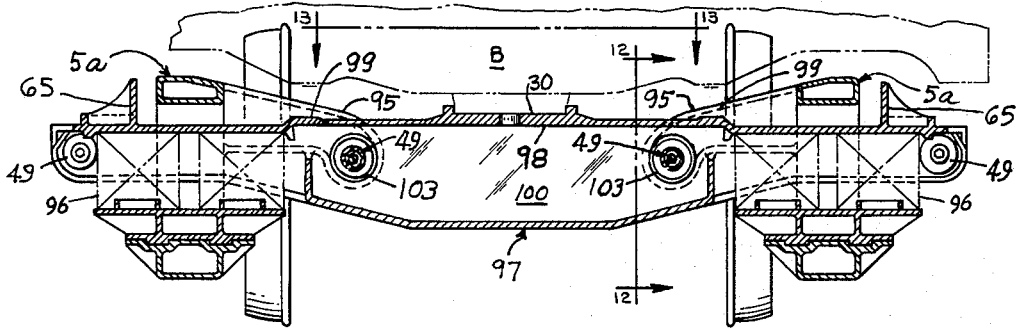
FIG. 11 is a vertical sectional view along the transverse center line of another modified truck embodying the invention.
Figure 4:
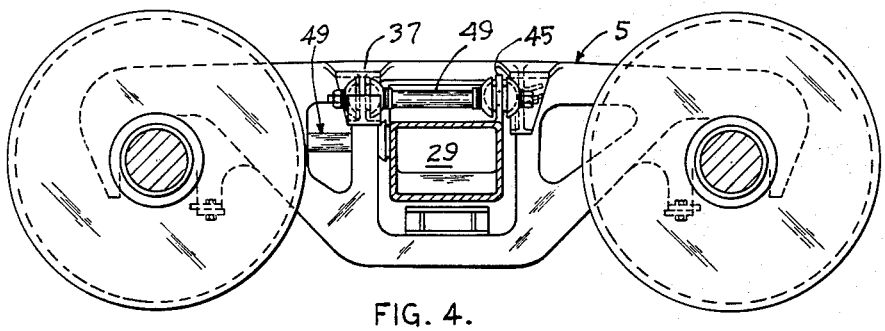
FIG. 4 is a longitudinal vertical sectional view along line 4—4 of FIG. 1.
Figure 12:
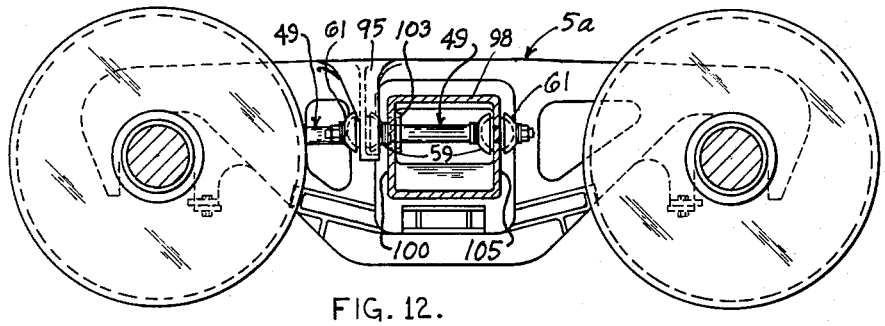
FIG. 12 is a longitudinal vertical sectional view along line 12—12 of FIG 11.
Figure 13:
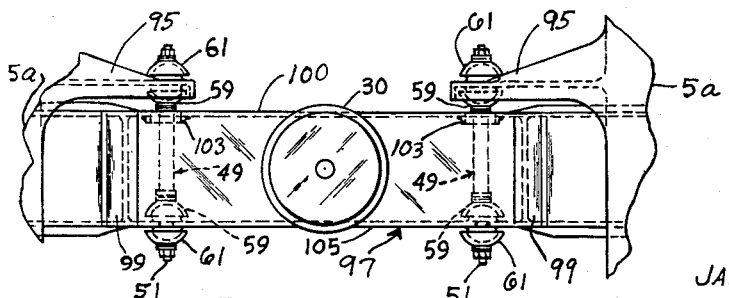
FIG. 13 is a fragmentary top view of the bolster and adjacent portion of the side frame of the truck illustrated in FIGS. 11 and 12.

FIGS. 11-13 illustrate a modified form of the truck in which the inner anchors 49 pass through, instead of over, the bolster as in the previously described embodiments, so that the truck may be used on cars having low underframe structures. The side frames 5a are generally similar to side frames 5 of the other disclosed embodiments, with the exception that inboard anchor brackets 95 are more downwardly inclined and terminate at a substantially lower level than brackets 37. Upright springs 96 seated on the bottom chords of side frames 5a support the ends of bolster 97. The top wall 98 of bolster 97 is substantially horizontal between side bearings 99, and the bolster side wall 100 adjacent brackets 95 is circularly apertured, as at 103, in substantial alignment longitudinally of the truck with the terminals of brackets 95. Anchors 49 pass through apertures 103 in bolster side wall 100, in parallel relation with the outboard anchors, and are secured at their opposite ends, in the manner described hereinabove, to the terminals of brackets 95 and to the remote bolster side walls 105.

Operation of the trucks disclosed herein is as follows: As a car supported on these trucks is drawn along straight track, draft forces are transmitted from the car body through the center plates 30, or central bearings 85, to the truck bolster and through parallel anchor links 49 to each of the side frames both of which are retained at right angles to the bolster as a result of the parallelism of the anchor links, and the side frames are accordingly retained in their normal relation to each other. When different vertical irregularities in the opposite rails are encountered, the side frames are free to tilt relative to each other about a common transverse axis because of the absence of column guides and the pivotal connections of the anchor to the side frames and bolster. When lateral irregularities in the track structure are encountered, the inertia of the car body opposes lateral movement of the bolster; since the side frames respond to such track irregularities, they tend to move laterally relative to the bolster, and such lateral movement is accommodated through lateral yieldability in the bolster-supporting springs and the lateral flexibility of the anchor link end connections which, however, due to the damping characteristic of the elastomeric masses 55, exerts a dampening effect on the lateral as well as vertical movements of the bolster. In the preferred form of the invention some lateral as well as vertical damping effect is also provided by the rubber in springs 23. As the car is drawn onto curved trackage, the tendency of the interaction of wheels and rails to force the truck out of square is opposed and effectively prevented by the action of the parallel anchor links 49, which maintain the side frames at right angles to the bolster. In trucks provided with the bolster construction illustrated in FIGS. 9 and 10, the friction central bearing opposed tendencies of the truck to oscillate about its vertical pivot axis, but the frictional resistance is not sufficient to interfere with normal truck swivel on curved track.

The details of the structure may be modified substantially without departing from the spirit of the invention and exclusive use of such modifications as come within the scope of the appended claims is contemplated.

What is claimed is:

1. A railway vehicle truck comprising a pair of wheel and axle assemblies, separate longitudinally-extending side frames supported on the end portions of said assembles and movable with respect to each other, upright springs carried by said side frames intermediate said assemblies, a transverse bolster supported at its end portions on said springs, and a pair of parallel substantially longitudinally-extending transversely spaced anchors at each side of the truck, one end of each of said anchors being connected to the adjacent side frame and the other end of each of said anchors being connected to said bolster.

2. A railway vehicle truck comprising a pair of wheel and axle assemblies, separate longitudinally-extending side frames supported on the end portions of said assemblies and movable with respect to each other, upright springs carried by said side frames intermediate said assemblies, a load-carrying transverse bolster supported at its end portions on said springs and extending laterally outboard of both said side frames, and parallel substantially longitudinally-extending anchors positioned inboard and outboard of each of said side frames and each pivotally connected at its one end to the adjacent side frame and at its other end to the bolster.

3. A railway vehicle truck according to claim 1 in which said springs comprise hollow masses of elastomeric material and metal coils embedded in said masses, the external and internal surface configurations of said masses conforming generally to the embedded coils.

4. A railway vehicle truck according to claim 1 in which said springs consist of metal coils, and said bolster and each of said side frames are connected by laterally acting oscillation damping devices.

5. A railway vehicle truck according to claim 1 in which said springs consist of metal coils, and said bolster and each of said side frames are connected by vertically acting oscillation damping devices.

6. A railway vehicle truck according to claim 1 in which said springs consist of metal coils, and said bolster and each of said side frames are connected by laterally and vertically acting oscillation damping devices.

7. A railway vehicles truck according to claim 1 in which said bolster and said side frames each has a perforate web at right angles to said anchors and each of said anchors comprises a central rod with its ends extending through a web of said bolster and a web of a side frame, a tubular spacer surrounding said rod between said webs inner collars mounted on said rod adjacent the ends of said tubular spacer and having concave semi-spherical sides facing said webs, outer similar collars mounted on the end portions of said rod on the opposite sides of said webs from said inner collars and having concave sides facing said webs, and substantially hemispherical masses of elastomeric material surrounding said rod and occupying the spaces between said webs and said inner and outer collars.

8. A railway vehicle truck according to claim 1 in which said bolster has at its center a vertical cylinder and an upwardly facing substantially horizontal surface surrounding said cylinder, said substantially horizontal surface being adapted to receive a flat annulus of friction material and thereby support a corresponding substantially horizontal downwardly facing surface of a vehicle body having a vertical cylinder in mating pivotal engagement with said bolster-mounted cylinder.

9. A railway vehicle truck comprising a pair of wheel and axle assemblies, separate longitudinally-extending side frames supported on the end portions of said assemblies, springs carried by said side frames, a transverse load-carrying bolster with its end portions supported on said springs, and substantially longitudinally-extending anchors adjacent to and spaced laterally inwardly of said side frames and each pivotally connected at its one end to the adjacent side frame and at its other end to said bolster, and additional substantially longitudinally-extending anchors adjacent to and spaced laterally outwardly from said side frames and each pivotally connected at one end to the adjacent side frame and at the other end to said bolster, said bolster forming the sole structural connection, other than said wheel and axle assemblies, between said side frames.

10. A railway vehicle truck according to claim 9 in which said inwardly-disposed anchors are connected to the side frames on one side of the bolster, and are connected to the side of the bolster remote from their connection to the side frames.

11. A railway vehicle truck according to claim 10 in which said anchors overlie the bolster.

12. A railway vehicle truck according to claim 10 in which said anchors extend within the bolster.

13. A railway vehicle truck according to claim 10 in which said anchors overlie the bolster throughout the major part of their lengths.

14. A railway vehicle truck according to claim 10 in which said anchors are positioned within the bolster throughout the major part of their lengths.

15. A railway vehicle truck according to claim 9 in which said outwardly disposed anchor links are connected to the side frames and the bolster on the same side of the bolster and said inwardly disposed anchor links are connected to the side frames adjacent one side of the bolster and to the bolster on the side thereof remote from their connections to said side frames.

16. A railway vehicle truck according to claim 9 in which said outwardly-spaced anchors are offset lengthwise of the truck from said bolster.

17. A railway vehicle truck according to claim 9 in which said inwardly-spaced anchors are positioned substantially in their entireties over the bolster whereby to eliminate interference with the truck wheels and brake rigging and said outwardly-spaced anchors are offset lengthwise of the truck from said bolster.

18. A railway vehicle truck comprising a pair of wheel and axle assemblies, separate longitudinally-extending side frames supported from said assemblies and having a pair of longitudinally-spaced opposing upright surfaces, spring seats on said side frame between said upright surfaces, upright springs carried by said spring seats, a transverse bolster extending between said side members and through the spaces between said upright surfaces, the portions of said bolster extending through said spaces being substantially narrower longitudinally of the truck than said spaces, said bolster being supported by its end portions on said upright springs for movement vertically and transversely of said side frames, and anchor links pivotally connected each at its one end to the extremities of the bolster outwardly of the side frames and extending longitudinally of the truck therefrom and each having its other end pivotally connected to the adjacent side frame, and additional anchor links similarly connected to the bolster and side frames inboard of the side frames and extending longitudinally of the truck in parallel relation with said outward links, said bolster forming the sole structural connection, other than said wheel and axle assemblies, between said side frames.

19. A railway vehicle truck according to claim 18 in which the top of said bolster is depressed intermediate each of its ends and its center and said inwardly-disposed anchor links are positioned substantially in their entireties in the depressions in said bolster.

20. A railway vehicle truck according to claim 18 in which said outwardly-disposed anchor links are offset substantially in their entireties from said bolster longitudinally of the truck and are at a lower level than the top of the bolster.

21. A railway vehicle truck according to claim 18, in which the top of said bolster is depressed intermediate each of its ends and its center and said inwardly-disposed anchor links are positioned substantially in their entireties in the depressions in said bolter and said outwardly-disposed anchor links are offset substantially in their entireties from said bolster and are at a lower level than the top of the bolster.

22. A railway vehicle truck according to claim 18 in which said inboard anchor links are positioned substantially in their entireties within said bolster.

23. A railway vehicle truck according to claim 18 in which said bolster has spaced side walls extending transversely of the truck, and said inboard anchor links pass freely through the bolster side wall adjacent said inboard brackets, and the connection of said inboard anchor links to the bolster is effected through the bolster side wall remote from said inboard brackets.

24. A railway vehicle truck according to claim 18 in which said inwardly-disposed anchor links are positioned throughout a substantial portion of their lengths within said bolster and said outwardly-disposed anchor links are offset substantially in their entireties from said bolster and are at a lower level than the top of the bolster.

References Cited by the Examiner

UNITED STATES PATENTS

| | | | |
|---|---|---|---|
| 1,619,087 | 3/1927 | Pampinella | 293—88 |
| 2,219,360 | 10/1940 | Green | 105—200 |
| 2,290,779 | 7/1942 | Tack | 105—218 X |
| 2,510,353 | 7/1950 | Travilla | 105—190 |
| 2,744,750 | 5/1956 | Smith | 105—200 X |
| 2,841,097 | 7/1958 | Travilla | 105—199 |
| 2,852,269 | 9/1958 | Gaines | 267—57 X |
| 2,877,720 | 3/1959 | Harley et al. | 105—197 |
| 2,889,784 | 6/1959 | Shafer | 105—197 |
| 2,908,230 | 10/1959 | Dean | 105—182 |
| 2,929,338 | 3/1960 | Lich | 105—200 |
| 2,972,489 | 2/1961 | Collier et al. | 267—57 X |
| 3,038,416 | 6/1962 | Janeway | 105—193 |

EUGENE G. BOTZ, *Primary Examiner.*

LEO QUACKENBUSH, ARTHUR A. LA POINT,
*Examiners.*

N. M. ELLISON, H. BELTRAN, *Assistant Examiners.*